(12) United States Patent
Mehr et al.

(10) Patent No.: US 7,610,344 B2
(45) Date of Patent: Oct. 27, 2009

(54) SENDER REPUTATIONS FOR SPAM PREVENTION

(75) Inventors: John D. Mehr, Seattle, WA (US); Nathan D Howell, Seattle, WA (US); Paul S Rehfuss, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 11/011,462

(22) Filed: Dec. 13, 2004

(65) Prior Publication Data

US 2006/0168024 A1    Jul. 27, 2006

(51) Int. Cl.
*G06F 15/16* (2006.01)
(52) U.S. Cl. .................. 709/206; 709/207; 709/202; 706/16; 707/10; 715/205
(58) Field of Classification Search ......... 709/206–207, 709/202; 706/16; 707/10; 715/205
See application file for complete search history.

(56) References Cited

U.S. PATENT DOCUMENTS

| 6,944,616 | B2 * | 9/2005 | Ferguson et al. .............. 707/10 |
| 7,127,741 | B2 * | 10/2006 | Bandini et al. ................ 726/14 |
| 7,257,564 | B2 * | 8/2007 | Loughmiller et al. ......... 706/16 |
| 2004/0210640 | A1 * | 10/2004 | Chadwick et al. ........... 709/207 |
| 2006/0010215 | A1 * | 1/2006 | Clegg et al. ................. 709/206 |
| 2006/0036690 | A1 * | 2/2006 | O'Neil ........................ 709/206 |
| 2006/0075030 | A1 * | 4/2006 | van Riel ..................... 709/206 |
| 2006/0123083 | A1 * | 6/2006 | Goutte et al. ................ 709/206 |

OTHER PUBLICATIONS

Exim.org, "Exim Specification- 45. Verification of incoming mail", Apr. 27, 2001, www.exim.org/exim-html-3.20/doc/html/spec_45.html, all pages.*
SendMail Emal Server, "Rejecting messages with empty subject and body", Jul. 28, 2004, www.experts-exchange.com/Software/Server_Software/Email_Servers/SendMail/Q_21074401.html, all pages.*
Jonathan B. Postel, "Simple Mail Transfer Protocol", Aug. 1982, www.ietf.org/rfc/rfc0821.txt, p. 5.*
Heinz Tschabitscher, "Mailblocks—Spam Filtering Service", 2003, About.com, all pages, http://email.about.com/cs/hostingreviews/gr/mailblocks.htm.*

* cited by examiner

*Primary Examiner*—Bunjob Jaroenchonwanit
*Assistant Examiner*—Hua Fan
(74) *Attorney, Agent, or Firm*—Lee & Hayes, PLLC

(57) ABSTRACT

Techniques are presented for assigning reputations to email senders. In one implementation, real-time statistics and heuristics are constructed, stored, analyzed, and used to formulate a sender reputation level for use in evaluating and controlling a given sender's connection to an message transfer agent or email recipient. A sender with an unfavorable reputation may be denied a connection before resources are spent receiving and processing email messages from the sender. A sender with a favorable reputation may be rewarded by having safeguards removed from the connection, which also saves system resources. The statistics and heuristics may include real-time analysis of traffic patterns and delivery characteristics used by an email sender, analysis of content, and historical or time-sliced views of all of the above.

42 Claims, 7 Drawing Sheets

SENDER REPUTATIONS FOR SPAM PREVENTION

TECHNICAL FIELD

The subject matter relates generally to electronic mail and more specifically to sender reputations for spam prevention.

BACKGROUND

Unsolicited Commercial Email (UCE) messages or "spam" can be malicious on several levels and are worthy of being denied further transfer on a network. An individual spam message may only be mildly "malicious" by having irrelevant content and may otherwise be benign. Nevertheless, reception of irrelevant content and the presence of the spam itself in a client mailbox are both unwanted, wasting resources and providing a degree of nuisance. Collectively, numerous spam messages from many random sources create significant loss of processing resources and provide a more intense nuisance. Worse yet, numerous spam messages can be sent in order to intentionally flood and overcome a recipient, resulting in a denial of the besieged recipient's usual services to customers and more favorable traffic. An individual spam message may also carry a virus or other intentionally malicious agent.

Conventional spam filters typically operate once an email communication (a "message" or an "email") between network nodes has already been received by a message transfer agent (MTA) or by a client. Such filters operating within a client or within an MTA server that handles incoming mail typically address the problem of incoming spam by characterizing content. These content filters use various criteria to analyze the likely meaning of the content "payload" of a message and thereby classify the content and the message appropriately as spam or non-spam.

As shown in FIG. 1, however, this technique of designating spam by filtering content poses a burden on network resources. Mere reception of a spam email message exposes the receiving node, such as MTA 100, to certain dangers and initiates a loss of machine resources during the various processes of accepting, analyzing, routing, and/or modifying the spam message. The MTA 100 may successfully stop or at least neutralize the spam, but has expended some resources in doing so. When the next spam message arrives, perhaps from the same sender, the MTA 100 dutifully begins the filtering process all over again from scratch, thus expending even more resources to stop each spam message that comes from the same sender.

An MTA 100 is especially vulnerable if it must expend resources to filter out spam and cannot help itself from spending an unanticipated amount of resources to deal with an unexpected amount of forthcoming spam. A spam attack on such an MTA 100 can successfully force the MTA 100 to use most of its resources in a bid to filter out the spam, allowing a spam sender to effectively disable vulnerable MTAs 100. Thus, there is a need to control spam before the spam imposes on the resources of an MTA 100 or a client.

SUMMARY

Techniques are presented for assigning reputations to email senders. In one implementation, real-time statistics and heuristics are constructed, stored, analyzed, and used to formulate a sender reputation level for use in evaluating and controlling a given connection between a message transfer agent and a sender. A sender with an unfavorable reputation may be denied a connection before resources are spent receiving and processing email messages from the sender. A sender with a favorable reputation may be rewarded by having some safeguards removed from the connection, which also saves system resources. The statistics and heuristics to be used may include real-time analysis of traffic patterns and delivery characteristics used by an email sender, analysis of content, and historical or time-sliced view of all of the above.

DETAILED DESCRIPTION

Overview

Techniques described below can create, in real time, reputations for email senders. A "sender reputation" is usually independent from any individual email message sent by the email sender. Sender reputations can relieve a system from examining individual email messages once a reputation established for a sender causes a connection from the sender to be blocked. Aspects of the subject matter described herein can be implemented in hardware, software, firmware, by a computing system, a cell phone system, a communications system, etc., or by other systems that can receive a "spam" or a malicious communication. In certain implementations, the subject matter may be described in the general context of computer-executable instructions, such as program modules, stored on computer-readable storage media, and being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

Rather than spending resources filtering individual email messages sent from a sender who has an unfavorable reputation, a recipient or message transfer agent (MTA) 100 can save resources by simply "turning off" the sender before messages are received, e.g., by denying or terminating an IP connection with the sender. For senders with favorable reputations, a system can also save resources by terminating spam filtering and other unnecessary safeguards in proportion to the quality of the good sender's favorable reputation.

Real-time statistics and heuristics used to determine sender reputations may be constructed, stored, analyzed, and used to formulate a sender reputation level for later use in evaluating a sender connecting to an MTA 100. The statistics and heuristics, described below, can include real-time analysis of traffic patterns between a given email sender and an MTA 100, content (email) based analysis, and historical or time-sliced views of all of the above.

Figure 1:
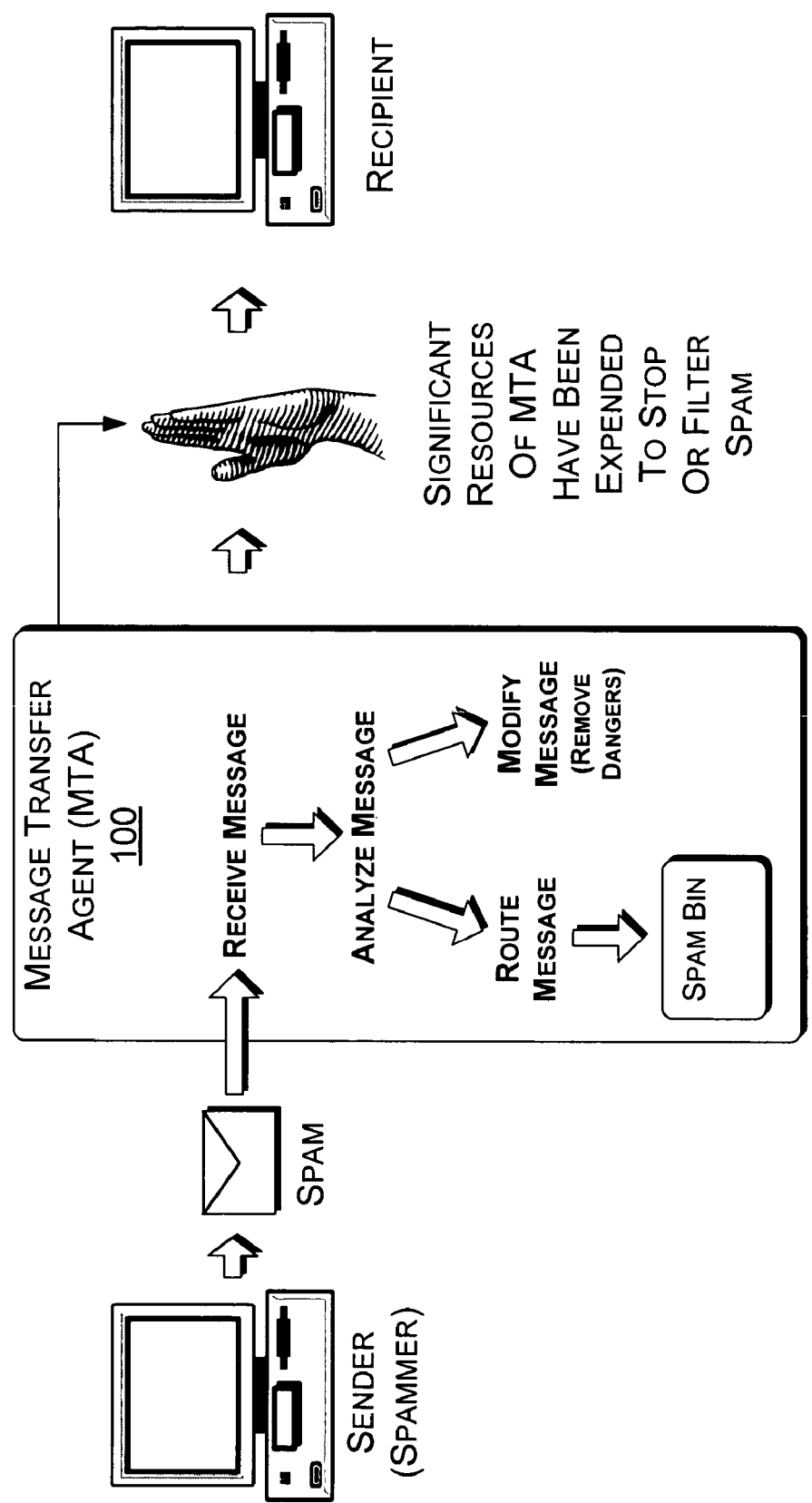
FIG. 1 is a graphic representation of conventional techniques for filtering spam email.
Figure 2:
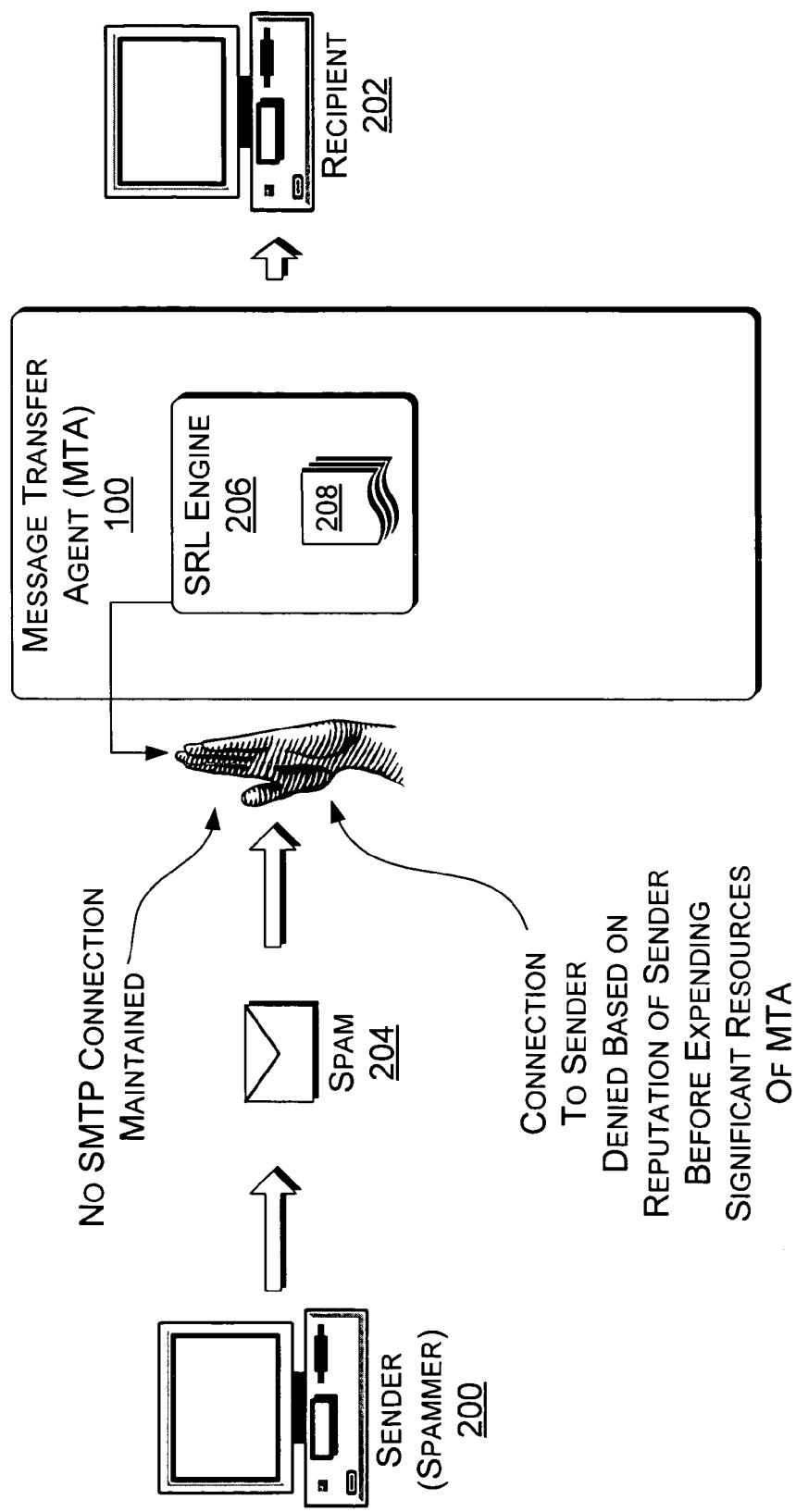
FIG. 2 is a graphic representation of an exemplary technique for blocking a connection to an email sender if the sender has an unfavorable reputation.

As shown in FIG. 2, a sender's unfavorable reputation can be used to proactively block spam and other undesirable email before the email reaches an MTA 100 or a recipient 202, i.e., to block the sender from connecting to a message transfer agent (MTA) 100. On the other hand, as mentioned above, a good reputation can be used to facilitate messages from a benign sender and the benign sender can even be given clearance to bypass additional checks such as spam filters—i.e., benign senders can ultimately be rewarded by the MTA 100 in an automated fashion.

Once an unfavorable reputation level is established, blocking can be implemented without examining further messages from the sender 200, that is, the sender is prevented from connecting before spam 204 can impose on system resources. Alternatively, further emails from the sender can be received and examined to refine and dynamically update the sender's reputation and then filtered from further transfer to a recipient 202.

A sender's reputation, as determined by the subject matter described herein, may be based on multiple characteristics, such as certain features of the mail delivery processes employed by the sender 200/spammer. Spam senders typically use various features of the mail delivery process in characteristic ways that can be counted (e.g., across numerous email messages) and subjected to statistical treatment in order to build a reputation for each sender.

In one implementation, analysis of the characteristics that result in determination of a reputation can be accomplished by a "sender reputation level" (SRL) engine 206. An SRL engine 206 may include a database of reputations, i.e., a "sender reputations database" 208 of the reputations of numerous senders.

In one implementation, reputations can be dynamically updated in real time as more email messages are received from each sender. In another implementation, reputations can be built offline by analyzing a repository of email messages. Dynamic updating of a sender's reputation can signal long-term changes in the sender's intentions or can signal a sudden change in the sender, such as an abrupt onset or an abrupt abandonment of malicious spamming behavior. More specifically, the sudden change can act as a efficient detector of a machine or mail server being compromised and used for malicious activity (zombies, open proxies, etc).

In one implementation, sender reputations are established by analyzing a number of different heuristics and subjecting the results to an intelligent filter to probabilistically classify the results and rank the sender. "Heuristic," as used here, means a common-sense "rule of thumb" that increases the chances or probability of a certain result. In the instant case, a heuristic is an indicator that addresses the probability that a sender 200 is a spammer, who merits a "low" or unfavorable sender reputation. The reputation rankings ("levels") thus arrived at via the heuristics may be used to proactively filter mail to be received from the sender 200.

Exemplary Sender Reputation Level (SRL) Engine 206

Multiple tests or "evaluations" for determining a sender reputation can be performed by an exemplary sender reputation level (SRL) engine 206. The evaluations apply a collection of heuristics to a delivery process used by a sender in order to arrive at a reputation level for the sender. Exemplary heuristics may include whether the sender is using an open proxy, whether the sender has sent mail to a trap account, the number of unique variables in the sender's commands, and other factors that indicate that a sender is more or less likely to be a spammer, apart from or in addition to the textual content of the sender's messages.

Figure 3:
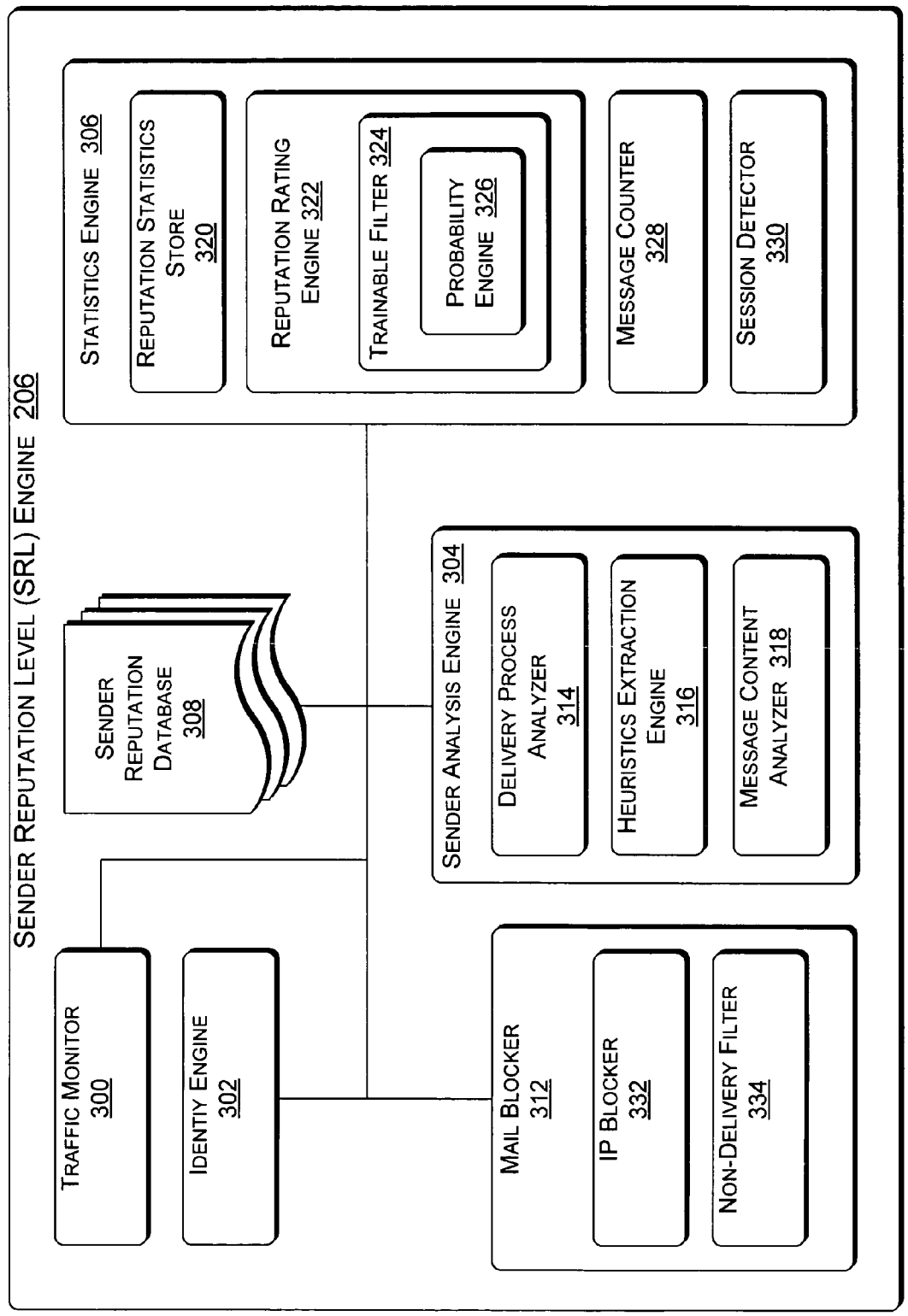
FIG. 3 is a block diagram of an exemplary sender reputation level engine.

FIG. 3 shows an exemplary SRL engine 206 presented as an example configuration. The example configuration includes a traffic monitor 300, an identity engine 302, a sender analysis engine 304, and a statistics engine 306, as well as other components, communicatively coupled as illustrated. Other implementations of an SRL engine 206 may be constructed by those skilled in the art upon reading the description herein. It is worth noting that an SRL engine, such as the illustrated exemplary SRL engine 206, may be implemented in software, hardware, or combinations of hardware, software, firmware, etc.

In an exemplary SRL engine 206, the traffic monitor 300 connects to certain layers of an email network, providing an interface between the email network and the SRL engine 206 in order to be able to examine individual email messages and gather statistics about senders. The traffic monitor 300 may include software that monitors the transport or protocol layer of SMTP within an MTA 100. From the monitored data, an identity engine 302 seeks to identify the sender of each individual email message. In one implementation, a sender can be identified (or defined) simply as a full 32-bit IP address.

The sender analysis engine 304 captures heuristic indications ("indicators") that can then be stored in the reputation statistics store 320 on a per-sender basis. The sender analysis engine 304 can also gather heuristics on a per-message and/or per-session basis after the transport or protocol layer of SMTP has completed (e.g., post-DATA command, etc.). The statistics engine 306, to be discussed below, develops these heuristic indications into a reputation.

The sender analysis engine 304, which may evaluate a whole collection of email characteristics, may deploy a battery of such evaluations on an individual email message, including tests on many of the aspects of the delivery process used to send the message. These tests generate indicators, that is, heuristic results that may be processed into reputation statistics.

Accordingly, the sender analysis engine 304 may include components, such as a delivery process analyzer 314, a heuristics extraction engine 316, and a message content analyzer 318. The delivery process analyzer 314 specializes in analysis of the characteristics of a sender's delivery process. The heuristics extraction engine 316, to be discussed more fully with respect to FIG. 4, may include a collection of formulas and/or algorithms for performing the evaluations. The aforementioned message content analyzer 318 may also be included to augment the analysis of the delivery process. In some implementations, the message content analyzer 318 provides a content indication that may be used as a reputation baseline or as one among many heuristics for determining a sender's reputation.

The statistics engine 306 determines a reputation for a sender from the heuristic indicators extracted by the sender analysis engine 304. The reputations determined by the statistics engine 306 may be stored in a sender reputation database 308. When reputation statistics and indicators are updated at the end of an SMTP session, they can be inserted back into a reputation statistics store 320, e.g., via the data access layer. Updated reputations or reputation levels can be inserted back into the sender reputation database 308.

In some implementations, a data access layer portion of the exemplary SRL engine 206 accesses, retrieves, inserts, and updates information in the reputation statistics store 320 and in the sender reputation database 308, or another data persistence store. Although a reputation statistics store 320 and a sender reputation database 308 are illustrated in FIG. 3 for persisting reputation indicators, statistics, and levels, these data for a given sender can be stored in other suitable locations, e.g., in a store that is independent or isolated from a given MTA 100. A suitable location can be a database, flat file, or other type of data repository that preferably has the ability to keep information associated with each sender in a normalized format, where the sender identity, e.g., as established by the identity engine 302, is the primary reference.

A reputation rating engine 322 included in the statistics engine 306 determines or estimates a sender's reputation level using the stored heuristic indicators. Thus, in one implementation the reputation rating engine 322 includes a trainable filter 324, to be discussed more fully below, that may include a probability engine 326 for applying statistical formulas and algorithms to the heuristic indicators.

The statistics engine 306 just described may also include a message counter 328 to keep track of the number of messages associated with a given sender and a session detector 330 to keep track of the beginning and end of an SMTP or other email exchange session in order to track changes in a sender's reputation resulting from the communications that occur during an SMTP session.

In one implementation, the reputation rating engine 322 uses the statistics and indicators stored in the reputation statistics store 320 to calculate an integer value within a given scale that represents the behavior or reputation level of a sender. A machine learning approach, either offline or online, allows this calculation to be probabilistic. The output can then be mapped to a specified value range.

The exemplary SRL engine 206 may also include a mail blocker 312 that uses sender reputations to proactively block connections and/or block spam and other undesirable email sent by the sender. The mail blocker 312 may retrieve a sender's reputation, if any, from the sender reputation database 308 and compare a reputation level with a threshold, e.g., an administrator-specified threshold. If the sender's reputation is not acceptable with respect to the threshold, then the mail blocker 312 may include an IP blocker 332 to deny or terminate an SMTP connection to the sender. A non-delivery filter 334 may be included to block further delivery of spam and other undesirable email from recipients further downstream in implementations in which the SRL engine 206 still receives or allows an MTA 100 to receive and analyze messages so that the received messages can be used to dynamically update sender reputations.

The mail blocker 312 may retrieve a given sender's existing reputation from the sender reputation database 308, e.g., via the data access layer. This may be performed at the beginning of a new SMTP session from a sender. At the end of the SMTP session, heuristics may be updated based on results determined by the sender analysis engine 304 and the statistics engine 306 during a session interval determined by the session detector 330.

The components, including the mail blocker 312 just described, may be communicatively coupled as illustrated in FIG. 3. In an alternative implementation, an SRL engine 206 includes a reduced number of components to perform email blocking but not analysis and modification of reputations. Such a streamlined implementation may include, for example, only the traffic monitor 300, the identity engine 302, the sender reputation database 308, and the mail blocker 312, but not the sender analysis engine 304 or the statistics engine 306.

Exemplary Heuristics Extraction Engine 316

In one implementation, an exemplary SRL engine 206 may utilize heuristics in combination with a machine learning approach that allows an independent MTA 100 to evaluate senders connecting to it, that is, uses real-time sender specific information collected on the MTA 100 to establish reputations for senders over time and then applies the reputations towards future attempts.

Figure 4:
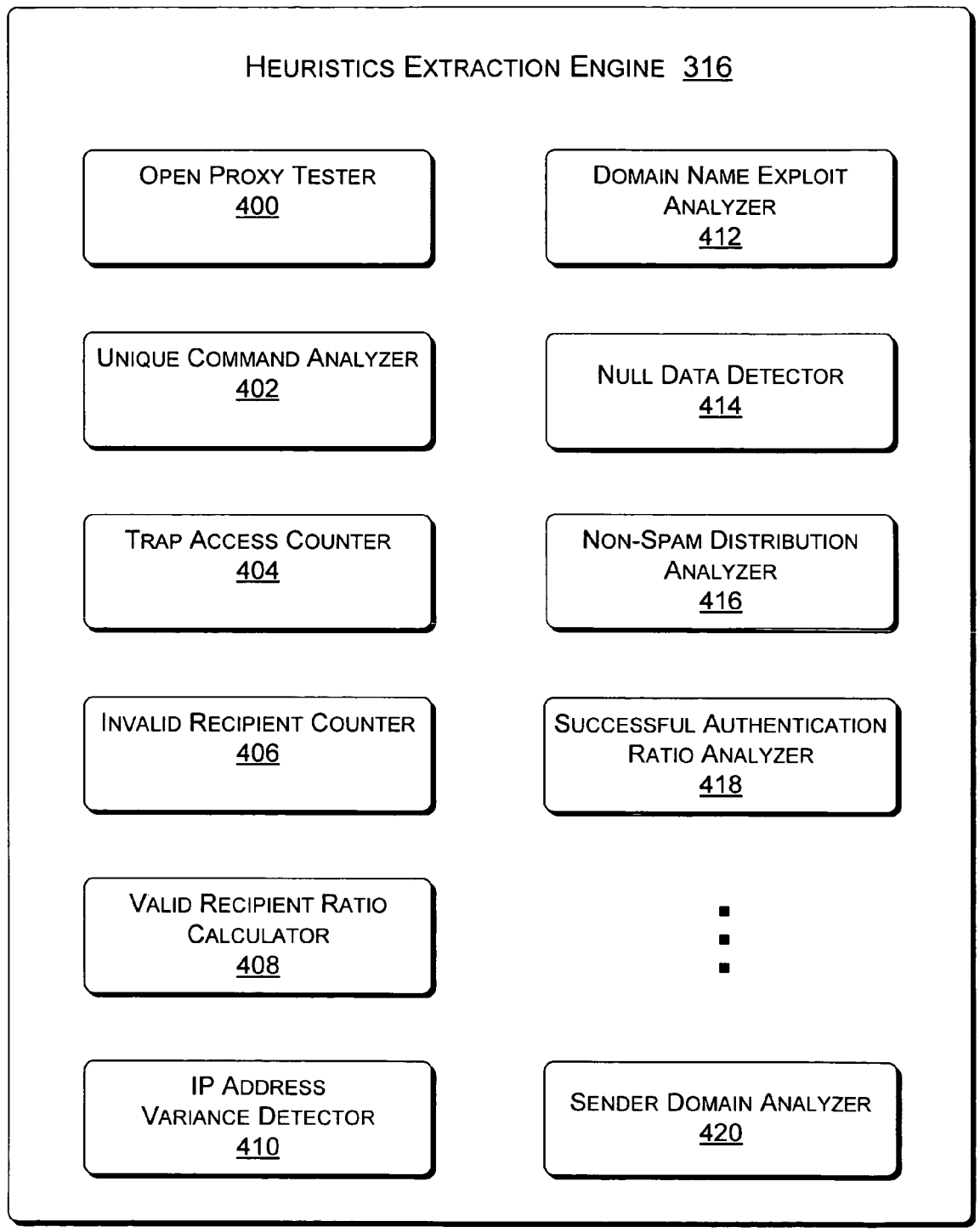
FIG. 4 is a block diagram of an exemplary heuristics extraction engine.

FIG. 4 shows an exemplary heuristics extraction engine 316 of FIG. 3 in greater detail. The illustrated heuristics extraction engine 316 presents an example configuration. Alternative implementations of a heuristics extraction engine 316 may be constructed by those skilled in the art upon reading the description herein. It is worth noting that an exemplary heuristics engine may be implemented in software, hardware, or combinations of hardware, software, firmware, etc.

Each heuristic may be collected or evaluated by a discrete component, as illustrated in FIG. 4. Alternatively, an exemplary heuristics extraction engine 316 may combine tests for two or more heuristics into a single component or software code. Some components may use or collect deterministic Boolean values. Ratios and distributions that improve or worsen a sender's reputation can be continually updated as more traffic arrives from the sender. Results can also be split into time-sliced views, expanding the overall utility and quantity of the heuristics.

An open proxy tester 400 may determine the current open proxy status of a given sender. A value can be determined by an external component that performs open proxy testing against senders and/or by utilizing a third-party list of open proxies. As much as 60-80% of spam currently on the Internet is estimated to originate from exploited open proxies or from "zombies" (i.e., exploited end-user personal computing machines).

A unique command analyzer 402 gathers indicators related to use of the SMTP verbs "HELO," "Mail From," "RCPT," etc. For example, in one implementation the unique command analyzer 402 aims to determine an integer that represents the total unique values that have been provided by a sender in each of their HELO/EHLO SMTP commands over a given time-frame. A majority of benign senders send their email messages using a finite number of HELO/EHLO statements. Malicious senders may continually modify this value in an attempt to disguise themselves from an administrative view of system behavior.

A trap access counter 404 may be included in the heuristics extraction engine 316 to provide an indication of attempted access to trap recipients, a probable indication of spamming activity. An MTA 100 may populate or designate a list of recipients within an organization (supported domains at the MTA level) that are deemed traps, or "honeypots." This indicator represents the number of recipient attempts against trap accounts by a given sender. Trap accounts represent recipients that should otherwise never be receiving email. If a spammer utilizes a list of account names in order to mine a domain's namespace, the sender will probably eventually submit requests to send email to a trap account. This provides a metric for identifying the sender as a spammer.

An invalid recipient counter 406 aims to detect the number of RCPT attempts by a sender that have failed due to the recipient not existing within the organization. Benign senders typically have a value slightly above zero for this heuristic because the originating sender of an email may perform a typo when entering a legitimate recipient's address or a legitimate recipient may have previously existed but was later removed. Bad senders, however, often have a very high invalid recipient count if they are attempting to mine the namespace of the organization.

A valid recipient ratio calculator 408 tracks a value that represents a ratio of valid versus invalid RCPT attempts by a sender. This heuristic may be set up as a derivative function of the invalid recipient counter 406 described above, and may be useful in helping to catch dictionary attack attempts, and namespace mining from malicious senders.

An IP address variance detector 410 aims to produce a value representing the number of times a sender submits a HELO/EHLO statement that contains an IP address that does not match the originating IP of the SMTP session. In many cases, a legitimate sender provides their IP address in the HELO/EHLO statement. Malicious senders often provide the IP address of a different host or of the receiving host in the HELO/EHLO statement to obfuscate their presence, or otherwise bypass any restrictions that the MTA 100 may have in place for the HELO/EHLO command.

A domain name exploit analyzer 412 seeks to determine a value representing the number of times a sender submits a HELO/EHLO statement that contains a domain name (e.g. host.com) that is included in the list of locally supported domains on the receiving host MTA 100. Many malicious senders attempt to obfuscate their identity, or bypass any restrictions applied to the HELO/EHLO command at the MTA 100 by presenting themselves as a domain name that is known to be locally supported by the receiving MTA 100. For example, a spam sender may connect to Microsoft.com's MTA and issue the HELO statement: "HELO smtp1.microsoft.com".

A null data detector 414 may be included to determine a value representing the number of DATA commands from a given sender that are followed by no subsequent data content before being terminated. In many cases, an MTA 100 will automatically stamp a received header during this portion of the SMTP transport. In one implementation, this heuristic may be calculated post-transport by measuring the size consumed by the received header and then subtracting the measured size from the overall size of the information presented in the DATA command. In addition to invalid recipient attempts, a malicious sender that is conducting a dictionary attack or namespace mining exercise will often, in cases where invalid RCPT commands are not directly rejected at the SMTP protocol level, proceed with an SMTP session and submit no content via the DATA command. Then, if a non-delivery report (NDR) message returns to the sender, the sender can automate the processing of those messages and reconcile against their attempted recipients to deduce the valid recipients. This heuristic is designed to identify and catch this malicious behavior.

A non-spam distribution analyzer 416 aims to provide a heuristic based on the distribution of good mail versus bad mail over time, where "good" and "bad" are with respect to email content. A definition of bad content, for example, may also include virus, worm, and spam content in email messages. In one implementation, the determination of goodness or badness as applied to email messages can be made with a conventional tool that analyzes email content. Using a suitable conventional message content analysis and categorization tool, a baseline reputation can be established for a sender.

In addition, a non-spam distribution analyzer 416 may gather heuristics according to a time-sliced view. By comparing time slices, a sending machine that may have been compromised and has become malicious may be detected or, alternatively, a machine that has been repaired and has become benign may be detected. For example, if a sender has submitted a total of 100,000 emails to a recipient in the past thirty days and the good email versus bad email volume is currently 98,100 good emails to 1900 bad emails, the distribution represents a fairly clean history. But, if in the past six hours the distribution shifts to 1800 good emails versus 200 bad emails, then the sender may have become compromised since the nature of the sender's delivery behavior and/or content has changed. The sender may now be blocked by the mail blocker 312.

A successful authentication ratio analyzer 418 may also be included to determine a ratio between successful and failed SMTP AUTH attempts from a given sender. Authenticated SMTP connections are typically configured to bypass all MTA level anti-spam processing. A malicious sender may attempt a brute force use of the SMTP AUTH command in order to gain access and ensure their spam email is delivered.

A sender domain analyzer 420 may be included to find various attributes of the sender's domain name, such as first of all whether or not a domain name is provided; whether the domain name belongs to a reputable domain such as .edu, .gov, or .mil; whether the domain—in this context defined as the text resulting from a reverse DNS lookup (or a PTR DNS record) mapping the IP address to a domain— appears to point to a private computer instead of a genuine domain (e.g., contains strings such as "dsl" or "cable"), etc. Typically, only malicious senders use IP addresses that don't have a domain name. Private computers typically do not send email except when they have been compromised by a malicious sender. Restricted membership domains such as .gov and .mil typically do not have malicious senders. Although a restricted domain, .edu domains frequently act as "forwarders", relaying email sent to alumni. Such forwarders usually should not be blocked even when they are relaying spam.

Other components may be included in an exemplary heuristics extraction engine 316 for determining additional heuristic indicators that can be used to develop sender reputations.

Determining Sender Reputations

In one implementation of the statistics engine 306, the reputation rating engine 322 begins formulating a sender's reputation level by starting with a neutral rating. Once a minimum number of messages has been counted by the message counter 328 for the particular sender, a first calculation of the sender's reputation level is performed. This first calculation of a reputation level changes the initial neutral rating to a higher or lower value, establishing this sender as either more trustworthy—as a sender of good email manifesting good sending behavior—or less trustworthy—as a sender of malicious email manifesting objectionable sending behavior. In another implementation, the sender's reputation level is calculated regardless of minimum volume of email messages received from the sender. However, no action is taken using the reputation level value until a minimum volume of emails received from the sender is achieved.

An initial reputation level or a reputation level statistically confirmed by a sufficient volume of emails can be used with a selected threshold by the IP blocker 332, the mail blocker 312, or by an administrator of an MTA 100 to prevent attacks or to prevent further connections from the sender. A sender reputation level that is over the selected threshold initiates a block on all email from the sender. This block may take various forms. As described above, the block may be at the IP connection level, a type of block that conserves the most resources for the MTA 100 and recipient 202 by avoiding even reception of the sender's email. However, an IP address block may allow the sender to detect that they are being blocked. Alternatively, the above-mentioned non-delivery filter 334 may block by simply causing email messages to not be delivered. This uses more resources, but is less detectable by the sender. This latter type of blocking action may be preferable in many cases, since a sender who can detect the block may just resort to sending spam from another address.

In one implementation, a method of computing a sender reputation level uses a trainable classifier (trainable filter) 324. The trainable filter 324 is trained to gather specific inputs from senders' messages, such as the above heuristics, and to use them to estimate the probability that a sender with these inputs is malicious. The training occurs offline, e.g., outside of a system using the trainable filter 324. In one implementation, the result of training is a set of weights associated with each heuristic. Then at runtime, in a system using the trainable filter 324, the heuristics are examined, weights are added up, and the results are converted into a probability, and/or thresholded, etc. That is, the probabilities may be thresholded into a set of discrete levels. The sender reputation level is intended to be information about a sender as a whole, not about an individual message, but often the same heuristics and similar techniques can be used to estimate a per-message conditional probability that a message is spam, given its sender.

Given a set of chosen inputs, training the trainable filter 324 may be accomplished across a large collection of senders. The statistical relation between the inputs' values for each sender may be analyzed, e.g., in relation to degree of known maliciousness, thereby producing a set of parameters ("weights") for a classification function, e.g., a "profiler." When this function, with these parameters, is applied to the corresponding inputs for a new sender, the function produces an estimate of the probability that the new sender is malicious. Various well-known techniques exist for training classifiers, and one of these may be used to assist training the trainable filter 324.

Being probabilistic, such classifiers make errors, either classifying a benign sender as malicious (a "false positive"), or classifying a malicious sender as benign (a "false negative"). Thus, in some implementations, probability thresholds that determine various sender reputation levels may be selected by a user to provide a reasonable compromise between false positives and false negatives.

Exemplary Methods

Figure 5:
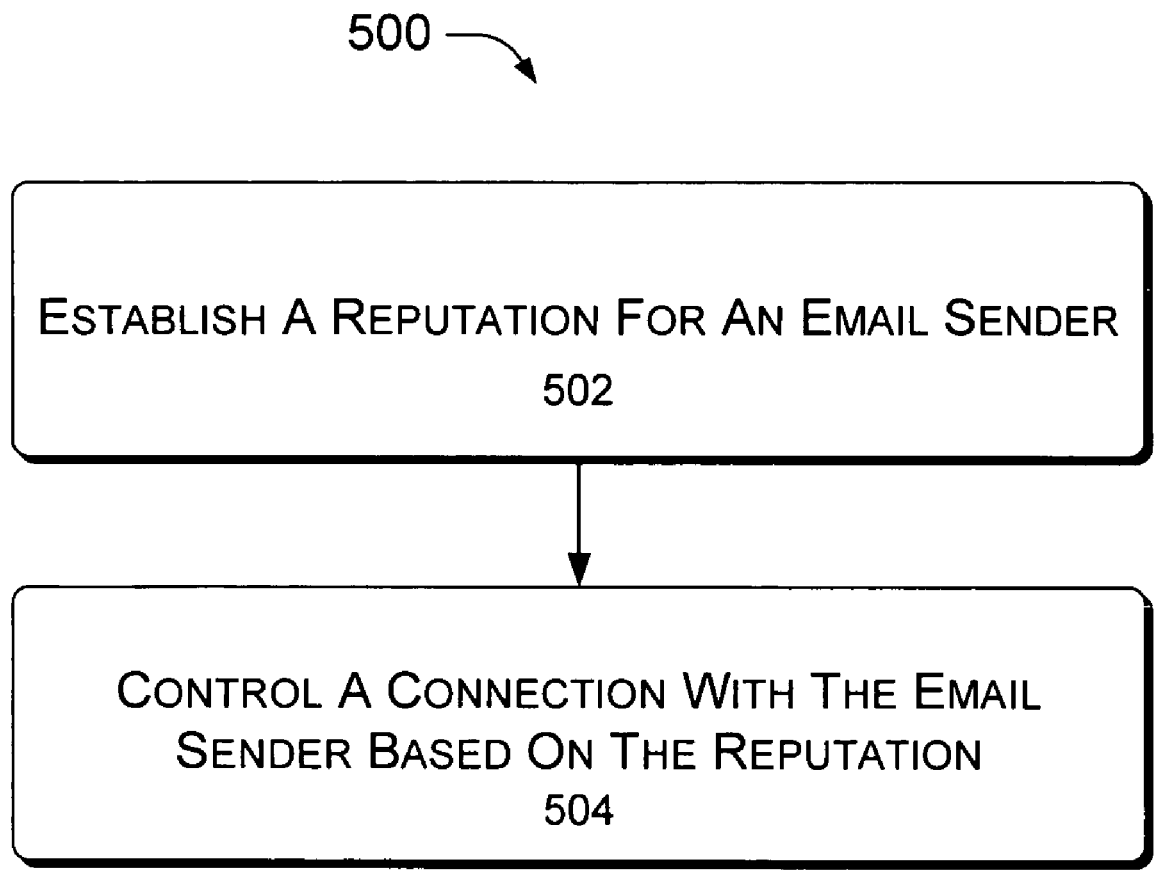
FIG. 5 is a flow diagram of an exemplary method of controlling a connection to an email sender.

FIG. 5 shows an exemplary method 500 of controlling a connection to an email sender. In the flow diagram, the operations are summarized in individual blocks. The exemplary method 500 may be performed by hardware, software, or combinations of both, for example, by an exemplary SRL engine 206.

At block 502, a reputation is established for an email sender. To establish the reputation, multiple delivery characteristics used by the sender and optionally, content characteristics of email messages from the sender, are selected for evaluation. Each characteristic to be evaluated can be viewed as a heuristic, or "rule of thumb" indicator that can be assigned a value representing whether the sender is more or less likely to be malicious or sending unsolicited commercial email—spam.

In one implementation, a quantity of evaluated values from the delivery characteristics of numerous messages from the sender can be compared, e.g., using a trainable filter 324, with a threshold to determine a reputation level. A greater quantity of email messages subjected to evaluation for tell-tale indications of favorable or unfavorable email behavior often results in a more refined and/or statistically sound reputation for a given sender.

A "nearest neighbor" or a "similarity-based" classifier may be used to arrive at a reputation. Such an exemplary classifier can compare a distribution of the collected indicators, that is, the evaluated delivery characteristics, with a statistical distribution (e.g., a profile) of collected indicators from emails associated with a known type of sender, for example, a malicious sender or a spammer. Similarly, a sender reputation may also be achieved by comparing a distribution of the collected indicators with a distribution profile of collected indicators from a mixture of different types of senders, that is, a profile that represents an average or collective norm. In these latter implementations, the degree of variance from an agreed upon norm or statistical distribution profile can be used to assign a reputation level to a sender.

At block 504, a connection with the email sender is controlled, based on the reputation established for the sender. If an unfavorable reputation is already established, then a mail blocker 312 may deny connection with the sender. In some implementations, this means that an exemplary SRL engine 206 expends only enough resources to identify the IP address of the sender and then block a connection to the sender.

Figure 6:
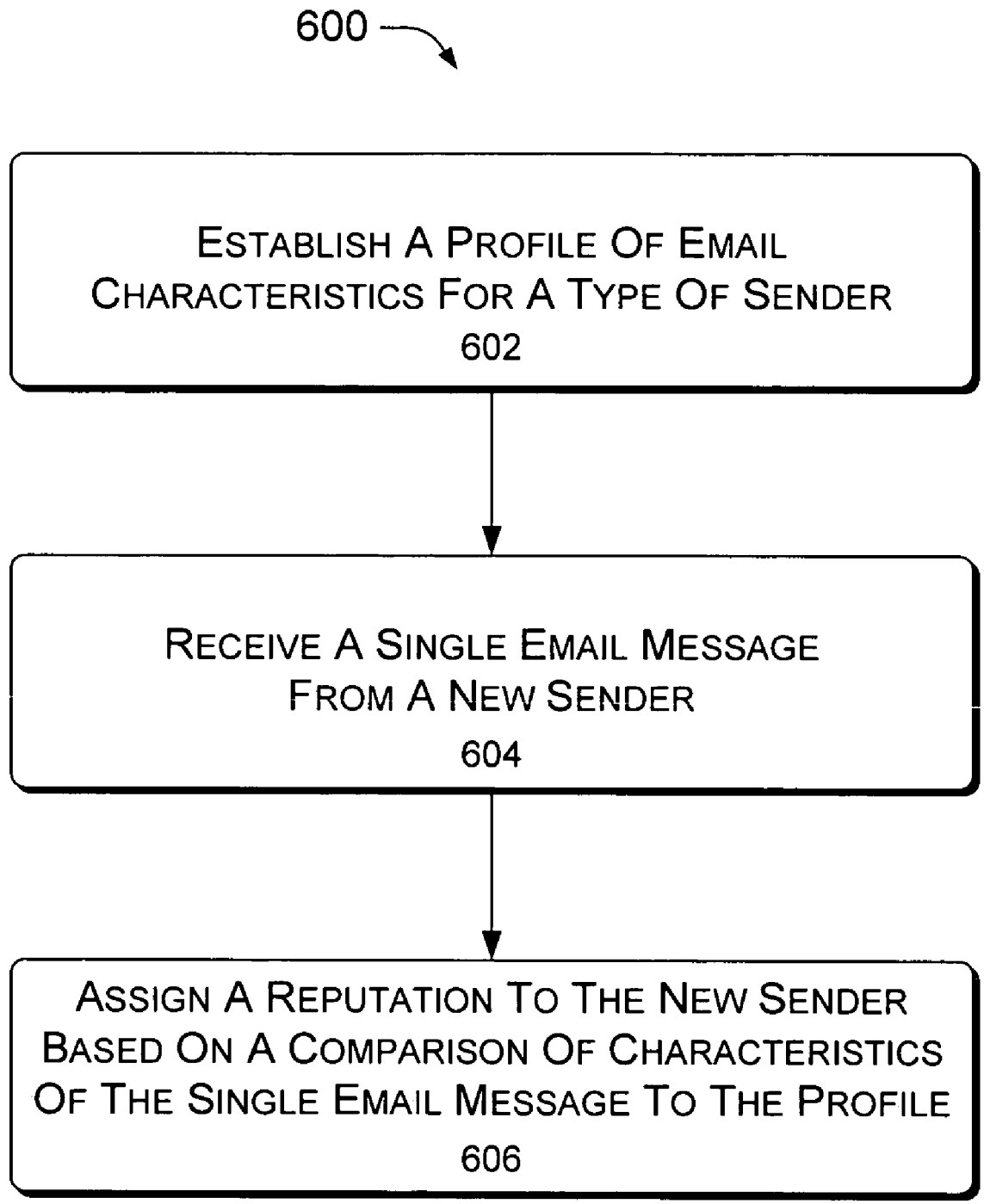
FIG. 6 is a flow diagram of an exemplary method of assigning a reputation to a new email sender based on a single email message from the new sender.

FIG. 6 shows another exemplary method 600 of assigning a reputation to a new email sender based on a single email message from the new sender. Heuristics are used to create a profile of characteristics of a hypothetical sender, for example, a hypothetical spam sender. A single email message from a new sender can be parsed for characteristics and compared with the profile to assign a reputation to the new sender on receiving the first email message from the sender. This may occur, for example, in a fingerprint/signature setup, where the first email message matches the signature of a know spam message, and hence is essentially identical to a known spam.

In the illustrated flow diagram, the operations are summarized in individual blocks. The exemplary method 600 may be performed by hardware, software, or combinations of both, for example, by an exemplary SRL engine 206.

At block 602, a profile of email characteristics for a type of sender, e.g., a malicious sender, is established. An exemplary profile may be constructed by a trainable filter 324 and/or a probability engine 326 that can create a map, fingerprint, distribution profile, etc., of email characteristics that typify the type of sender being profiled. That is, each characteristic selected for inclusion in a profile is a heuristic that indicates whether a sender is more or less likely to be the same type of sender that the profile typifies. Examples of characteristics that may serve as heuristics for such a profile are described with respect to FIG. 4.

At block 604, a single email message is received from a new sender. The same email characteristics that are used in the profile of block 602 are evaluated in the received single message from the new sender.

At block 606, a reputation is assigned to the new sender based on a comparison of the characteristics evaluated in the single email message to the profile. In other words, a degree of similarity to or variance from a profile of a hypothetical type of sender can allow the reputation of a new sender to be profiled based on a single email. Of course, latitude may be built into an engine performing this exemplary method 600—a reputation built on a single email message is given much leeway for revision as compared to a sender reputation built upon thousands of emails from the sender. The exemplary method 600 can be especially useful when an exemplary SRL engine 206 is used as a "first impression engine" to assign a sender reputation on first contact with the sender.

Figure 7:
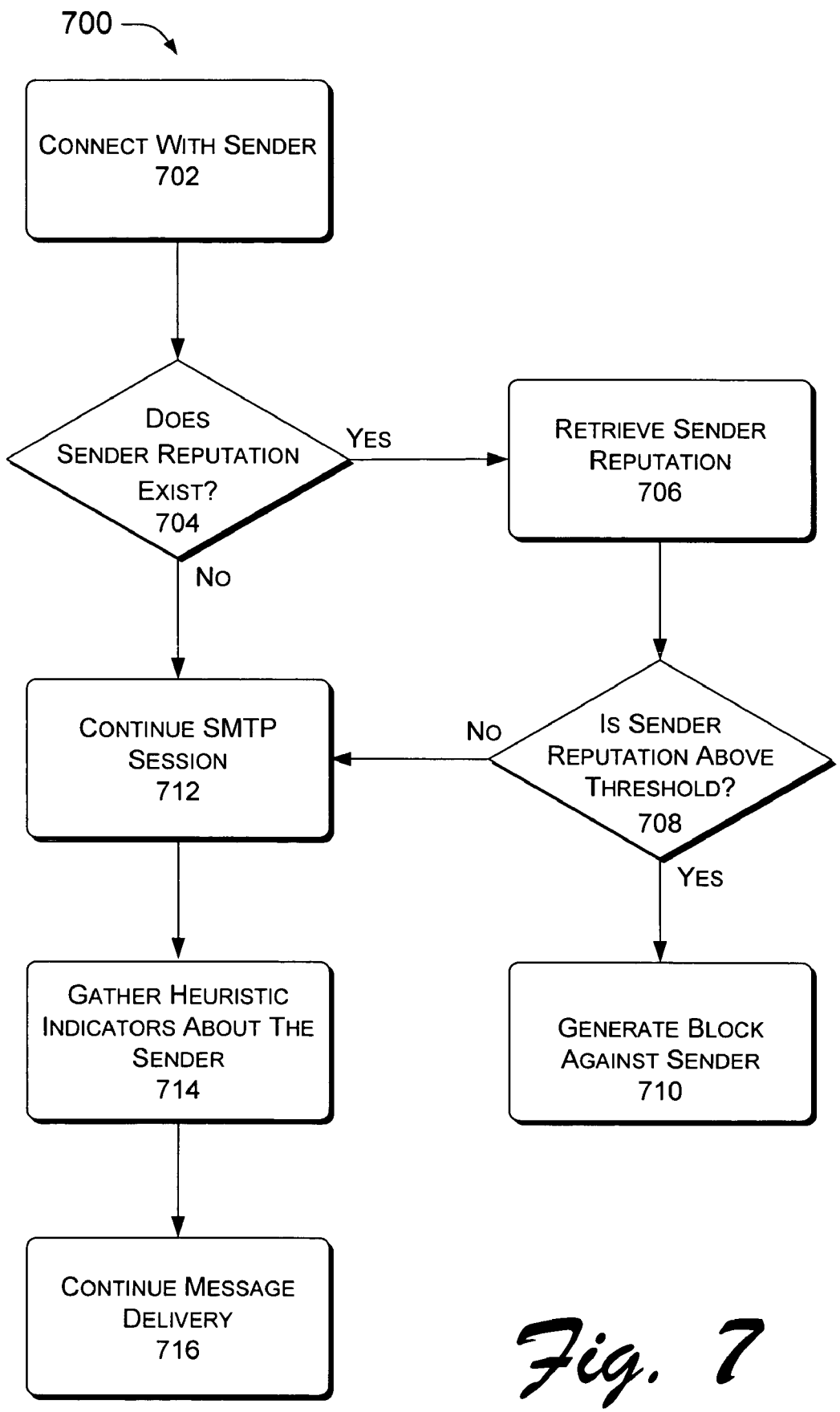
FIG. 7 is a flow diagram of an exemplary method of using an email sender reputation.

FIG. 7 depicts an exemplary method 700 of using and refining a pre-established sender reputation. In the flow diagram, the operations are summarized in individual blocks. The exemplary method 700 may be performed by hardware, software, or combinations of both, for example, by an exemplary SRL engine 206.

At block 702, a connection is made with a sender. The connection can be the initiation of an SMTP connection, and does not imply an open channel over which the sender can send a salvo of email messages to an MTA 100. A traffic monitor 300 may control the connection with a sender, e.g., over transport or protocol layers in an MTA 100.

At block 704, the exemplary method 700 evaluates whether a reputation exists, e.g., by checking a sender reputation database 308. If a reputation exists for the sender, then the exemplary method 700 branches to block 706, otherwise it branches to block 712 if a sender reputation does not exist.

At block 706, the exemplary method 700 retrieves the sender reputation from the sender reputation database 308. In the sender reputation database 308, a sender's reputation may be indexed by whatever form of identity is used by an identity engine 302, for example, a sender's 32-bit IP address, a derivative or hash thereof, etc.

At block 708, the exemplary method 700 evaluates whether the retrieved sender reputation is above a selected threshold. The threshold may be determined by statistical methods, for example, by running a trainable filter 324 against a repository of various email messages. Then, by evaluating how well the threshold separates actual email senders who should have favorable reputations from actual email senders who should have unfavorable reputations, the exemplary method can choose a threshold that gives a desirable tradeoff between the two types of error: i.e., treating a good emailer as bad because its retrieved reputation is above threshold, and treating a bad emailer as good because its retrieved reputation is below threshold. If a given sender reputation is above the threshold, that is, if the sender should have an unfavorable reputation, then the exemplary method branches to block 710, otherwise the exemplary method branches to block 712.

At block 710, a block is generated against the sender, for example, a connection with the sender may be blocked or terminated by a mail blocker 312 that has an IP blocker 332, or email from the sender is filtered out by a non-delivery filter 334. If an IP blocker 332 is used, then subsequent connection attempts from the sender may fail, preventing the sender from submitting more email or consuming more server resources.

At block 712, if the sender did not yet have an established sender reputation or the sender reputation was below a threshold for having an unfavorable reputation, then the communications session (for example, the SMTP session) continues.

At block 714, heuristics continue to be gathered for refining the sender's reputation. In some implementations, an exemplary method 700 can incorporate the new heuristic data into a revised reputation in real time and branch back to block 708 at this point to evaluate whether incorporation of a relatively few new heuristics has pushed the revised reputation over the threshold. Once heuristics have been gathered and processed, they are merged with the known information retrieved earlier by either overriding Boolean values or updating/incrementing other types of values.

At block 716, since the sender either does not have a reputation yet or the reputation is not above the threshold, message delivery from the sender is continued, and mail is transferred to a recipient 202.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary sender reputations for spam prevention. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:

evaluating, by a mail transfer agent (MTA) independent of a mail recipient, a sender of an email, using multiple characteristics of an email delivery to establish a reputation for the sender of the email, wherein the sender of the email is connecting to the MTA, wherein evaluating comprises:

monitoring, real-time, traffic patterns between the sender of the email and the MTA, collecting sender-specific information and heuristics from the email delivery, wherein the collecting occurs real-time at a conclusion of a Simple Mail Transfer Protocol (SMTP) session, and wherein the sender-specific information and heuristics include: whether a domain name provided includes one of .edu, .gov, or .mil; or whether the domain appears to point to a private computer, applying, in combination with the sender-specific information and heuristics, a machine learning process to generate an integer, the integer representative of a probabilistic reputation for the sender of the email, wherein the machine learning process classifies results of the evaluation of the delivery characteristics to establish the reputation, establishing a baseline reputation for the sender, comprising: evaluating a content of each email message from the sender; evaluating a ratio of emails that include favorable content to emails that include unfavorable content, per unit of time; and evaluating changes in the ratio over multiple units of time, comparing a first group of the evaluated delivery characteristics evaluated during a first time period with a second group of the evaluated delivery characteristics evaluated during a second time period to detect a change in a delivery behavior of the sender, wherein detecting a sudden change in the delivery behavior of the sender is an indication of malicious activity, malicious activity including a machine or a mail server being compromised, wherein the sudden change in the delivery behavior of the sender comprises: an abrupt onset or an abrupt abandonment of malicious spamming behavior; and using a trainable filter to perform the evaluating multiple characteristics of an email delivery to establish the reputation for the sender;

training the trainable filter by analyzing email delivery used by multiple senders, the training occurring offline, outside of a system using the filter; and controlling a connection with the sender based on the reputation.

2. The method as recited in claim 1, wherein said evaluating multiple characteristics includes determining a probability that the delivery is similar to a delivery of unsolicited commercial email resulting in an unfavorable reputation.

3. The method as recited in claim 1, wherein establishing a reputation includes:
    evaluating a message content in addition to said evaluating multiple characteristics of a delivery; and
    determining a similarity between the message content and an unsolicited commercial email content.

4. The method as recited in claim 1, wherein said evaluating multiple characteristics includes:
    evaluating multiple characteristics of multiple delivery processes associated with multiple email messages from the sender;
    counting instances of similarity between the evaluated characteristics and characteristics of unsolicited commercial email delivery; and
    basing the reputation on the counted instances.

5. The method as recited in claim 1, wherein said evaluating multiple characteristics includes:
    evaluating multiple delivery characteristics of multiple emails from the sender; and
    establishing the reputation based on a statistical comparison between the evaluated multiple delivery characteristics and delivery characteristics of email sent by at least one different sender.

6. The method as recited in claim 1, wherein said evaluating multiple characteristics includes:
    evaluating multiple delivery characteristics of multiple emails from the sender; and
    comparing a quantity of the evaluated delivery characteristics with a threshold to determine a reputation.

7. The method as recited in claim 1, wherein said evaluating multiple characteristics includes:
    evaluating multiple delivery characteristics of multiple emails from the sender; and
    comparing a statistical distribution of the evaluated characteristics with a distribution profile of delivery characteristics associated with a sender of unsolicited commercial email.

8. The method as recited in claim 1, wherein said evaluating multiple characteristics includes:
    evaluating multiple delivery characteristics of multiple emails from the sender; and
    comparing a statistical distribution of the evaluated characteristics with a norm distribution profile of delivery characteristics associated with a mixture of different email senders.

9. The method as recited in claim 1, wherein controlling a connection with the sender comprises proactively filtering email from a sender with an unfavorable reputation.

10. The method as recited in claim 1, wherein controlling a connection with the sender comprises denying an SMTP simple mail transfer protocol connection with the sender if the sender has an unfavorable reputation.

11. The method as recited in claim 1, wherein controlling a connection with the sender comprises terminating an SMTP simple mail transfer protocol connection with the sender if the sender has an unfavorable reputation.

12. The method as recited in claim 1, wherein controlling a connection with the sender comprises removing a safeguard from the connection if the sender has a favorable reputation.

13. The method as recited in claim 12, wherein the safeguard comprises a spam filter.

14. The method as recited in claim 1, wherein one of the characteristics of email delivery to be used as a heuristic for said establishing a reputation comprises an open proxy status of the sender.

15. The method as recited in claim 1, wherein one of the characteristics of email delivery to be used as a heuristic for said establishing a reputation comprises a number of unique values provided by the sender in HELO and EHLO commands of SMTP simple mail transfer protocol.

16. The method as recited in claim 1, wherein one of the characteristics of email delivery to be used as a heuristic for said establishing a reputation comprises a number of times the sender submits a HELO or a EHLO command of SMTP simple mail transfer protocol that includes an Internet protocol address that does not match the originating Internet protocol address of the SMTP session.

17. The method as recited in claim 1, wherein one of the characteristics of email delivery to be used as a heuristic for said establishing a reputation comprises a number of times the sender submits a HELO or a EHLO command of SMTP simple mail transfer protocol that includes a domain name that is included in a list of locally supported domains on a receiving message transfer agent.

18. The method as recited in claim 1, wherein one of the characteristics of email delivery to be used as a heuristic for said establishing a reputation comprises a number of times the sender submits a DATA command of SMTP simple mail transfer protocol followed by no subsequent information before being terminated.

19. The method as recited in claim 18, further comprising determining if said no information followed the DATA command by measuring a size of a received header and subtracting the size from an overall size of the of information included in the DATA command.

20. The method as recited in claim 1, further comprising assigning a reputation based on a single email message received from the sender, wherein the trainable filter compares delivery characteristics of the single email message to delivery characteristics of the multiple senders.

21. A sender reputation level engine, comprising:
    a traffic monitor to connect to an email network and monitor delivery of email;
    a sender analysis engine to gather heuristic indications associated with the email delivery process used by each sender of email, wherein each heuristic indication relates a probability that a sender sends malicious email or unsolicited commercial email, the gathering occurring real-time at a conclusion of a Simple Mail Transfer Protocol (SMTP) session,
    wherein the heuristic indications include: whether a domain name provided includes one of .edu, .gov, or .mil; or whether the domain appears to point to a private computer,
    the sender analysis engine further configured to compare a first group of delivery characteristics evaluated during a first time period with a second group of delivery characteristics evaluated during a second time period to detect a change in a delivery behavior of the sender, wherein detecting a sudden change in the delivery behavior of the sender is an indication of malicious activity, malicious activity including a machine or a mail server being compromised, wherein the sudden change in the delivery behavior of the sender comprises: an abrupt onset or an abrupt abandonment of malicious spamming behavior; and a statistics engine to determine a reputation level for each sender from statistical analysis of the gathered heuristic indications, the statistics engine comprising a machine learning process to generate an integer, the integer representative of a probabilistic reputation for a sender of an email, wherein a sender of malicious email or unsolicited commercial email is allotted an unfavorable reputation level.

22. The sender reputation level engine as recited in claim 21, further comprising a mail blocker to block communication from senders with unfavorable reputations.

23. The sender reputation level engine as recited in claim 21, further comprising a sender reputation database to store reputations and reputation statistics of multiple senders of email.

24. A computing device comprising the sender reputation level engine as recited in claim 21.

25. A system, comprising:
memory;
one or more processors operatively coupled to the memory;
means for evaluating, by a mail transfer agent (MTA) independent of a mail recipient, a sender of an email, using multiple characteristics of an email delivery to establish a reputation for the sender of the email based on the evaluated characteristics;
means for monitoring, real-time, traffic patterns between the sender of the email and the MTA,
means for collecting sender-specific information and heuristics from the email delivery, wherein the collecting occurs real-time at a conclusion of a Simple Mail Transfer Protocol (SMTP) session, and wherein the sender-specific information and heuristics include: whether a domain name provided includes one of .edu, .gov, or .mil; or whether the domain appears to point to a private computer,
means for comparing a first group of delivery characteristics evaluated during a first time period with a second group of delivery characteristics evaluated during a second time period to detect a change in a delivery behavior of the sender, wherein detecting a sudden change in the delivery behavior of the sender is an indication of malicious activity, malicious activity including a machine or a mail server being compromised, wherein the sudden change in the delivery behavior of the sender comprises: an abrupt onset or an abrupt abandonment of malicious spamming behavior;
means for applying, in combination with the said sender-specific information and heuristics, a machine learning process to generate an integer, the integer representative of a probabilistic reputation for the sender of the email; and
means for controlling a connection with the sender based on the reputation.

26. The system as recited in claim 25, wherein the means for establishing a reputation includes means for comparing a quantity of the evaluated delivery characteristics with a threshold to determine a reputation.

27. The system as recited in claim 26, wherein the means for establishing a reputation includes means for comparing a statistical distribution of the evaluated characteristics with a distribution profile of delivery characteristics associated with a sender of unsolicited commercial email.

28. The system as recited in claim 25, wherein the means for establishing a reputation includes means for comparing a statistical distribution of the evaluated characteristics with a norm of delivery characteristics associated with a mixture of different email senders.

29. The system as recited in claim 25, wherein the means for controlling a connection includes means for proactively filtering email from a sender with an unfavorable reputation.

30. The system as recited in claim 25, wherein the means for controlling a connection includes means for denying an SMTP simple mail transfer protocol connection with the sender if the sender has an unfavorable reputation.

31. The system as recited in claim 25, wherein the machine learning process classifies results of the evaluation of the delivery characteristics.

32. The system as recited in claim 25, farther comprising means for comparing a first group of the evaluated delivery characteristics evaluated during a first time period with a second group of the evaluated delivery characteristics evaluated during a second time period to detect a change in a delivery behavior of the sender.

33. A computer-readable storage medium including instructions capable of being read by a computing device to execute actions, including:
evaluating, by a mail transfer agent (MTA) independent of a mail recipient, a sender of email messages, using aspects of email delivery used by the sender of email messages;
monitoring, real-time, traffic patterns between the sender of the email messages and the MTA,
collecting sender-specific information and heuristics from the email delivery, wherein the collecting occurs real-time at a conclusion of a Simple Mail Transfer Protocol (SMTP) session,
counting, by a message counter, the number of messages received from the sender;
once a first administrator-specified number of messages has been counted by the message counter, applying, in combination with the said sender-specific information and heuristics, a machine learning process to generate an integer, the integer representative of a probabilistic reputation for the sender of the email messages;
comparing a statistical distribution of the evaluated aspects with a profile of delivery characteristics associated with a sender of unsolicited commercial email;
comparing a first group of delivery characteristics evaluated during a first time period with a second group of delivery characteristics evaluated during a second time period to detect a change in a delivery behavior of the sender, wherein detecting a sudden change in the delivery behavior of the sender is an indication of malicious activity, malicious activity including a machine or a mail server being compromised,
wherein the sudden change in the delivery behavior of the sender comprises: an abrupt onset or an abrupt abandonment of malicious spamming behavior;
establishing a reputation for the sender based on said applying and said comparing; and
once a second administrator-specified number of messages has been counted by the message counter, controlling a connection with the sender based on the reputation.

34. The readable medium as recited in claim 33, further including instructions to use an open proxy status of the sender as one of the aspects of email delivery to be used as a heuristic for establishing the reputation.

35. The readable medium as recited in claim 33, further including instructions to use a quantity of unique values provided by the sender in HELO and EHLO commands of SMTP simple mail transfer protocol as one of the aspects of email delivery to be used as a heuristic for establishing the reputation.

36. The readable medium as recited in claim 33, further including instructions to use a number of times the sender submits a HELO or a EHLO command of SMTP simple mail transfer protocol that includes an Internet protocol address that does not match the originating Internet protocol address of the SMTP session as one of the aspects of email delivery to be used as a heuristic for establishing the reputation.

37. The readable medium as recited in claim 33, further including instructions to use a number of times the sender submits a HELO or a EHLO command of SMTP simple mail transfer protocol that includes a domain name that is included in a list of locally supported domains on a receiving message transfer agent as one of the aspects of email delivery to be used as a heuristic for establishing the reputation.

38. The readable medium as recited in claim 33, further including instructions to use a number of times the sender submits a DATA command of SMTP simple mail transfer protocol followed by no subsequent information before being terminated as one of the aspects of email delivery to be used as a heuristic for establishing the reputation.

39. The readable medium as recited in claim 33, further including instructions to establish a baseline reputation for the sender, comprising:
  evaluating a content of each email message from the sender;
  evaluating a ratio of emails that include favorable content to emails that include unfavorable content, per unit of time; and
  evaluating changes in the ratio over multiple units of time.

40. The readable medium as recited in claim 33, further including instructions to use a trainable filter to perform said evaluating multiple aspects of an email delivery to establish a reputation for the sender.

41. The readable medium as recited in claim 33, further including instructions to train the trainable filter by analyzing email delivery used by multiple senders.

42. The readable medium as recited in claim 41, further including instructions to assign a reputation based on a single email message received from the sender, wherein the trainable filter compares delivery characteristics of the single email message to delivery characteristics of the multiple senders.

* * * * *

UNITED STATES PATENT AND TRADEMARK OFFICE
CERTIFICATE OF CORRECTION

| | | |
|---|---|---|
| PATENT NO. | : 7,610,344 B2 | Page 1 of 1 |
| APPLICATION NO. | : 11/011462 | |
| DATED | : October 27, 2009 | |
| INVENTOR(S) | : John D. Mehr et al. | |

It is certified that error appears in the above-identified patent and that said Letters Patent is hereby corrected as shown below:

In column 16, line 14, in Claim 32, delete "farther" and insert -- further --, therefor.

Signed and Sealed this
Eighth Day of February, 2011

David J. Kappos
*Director of the United States Patent and Trademark Office*